Patented Aug. 8, 1933

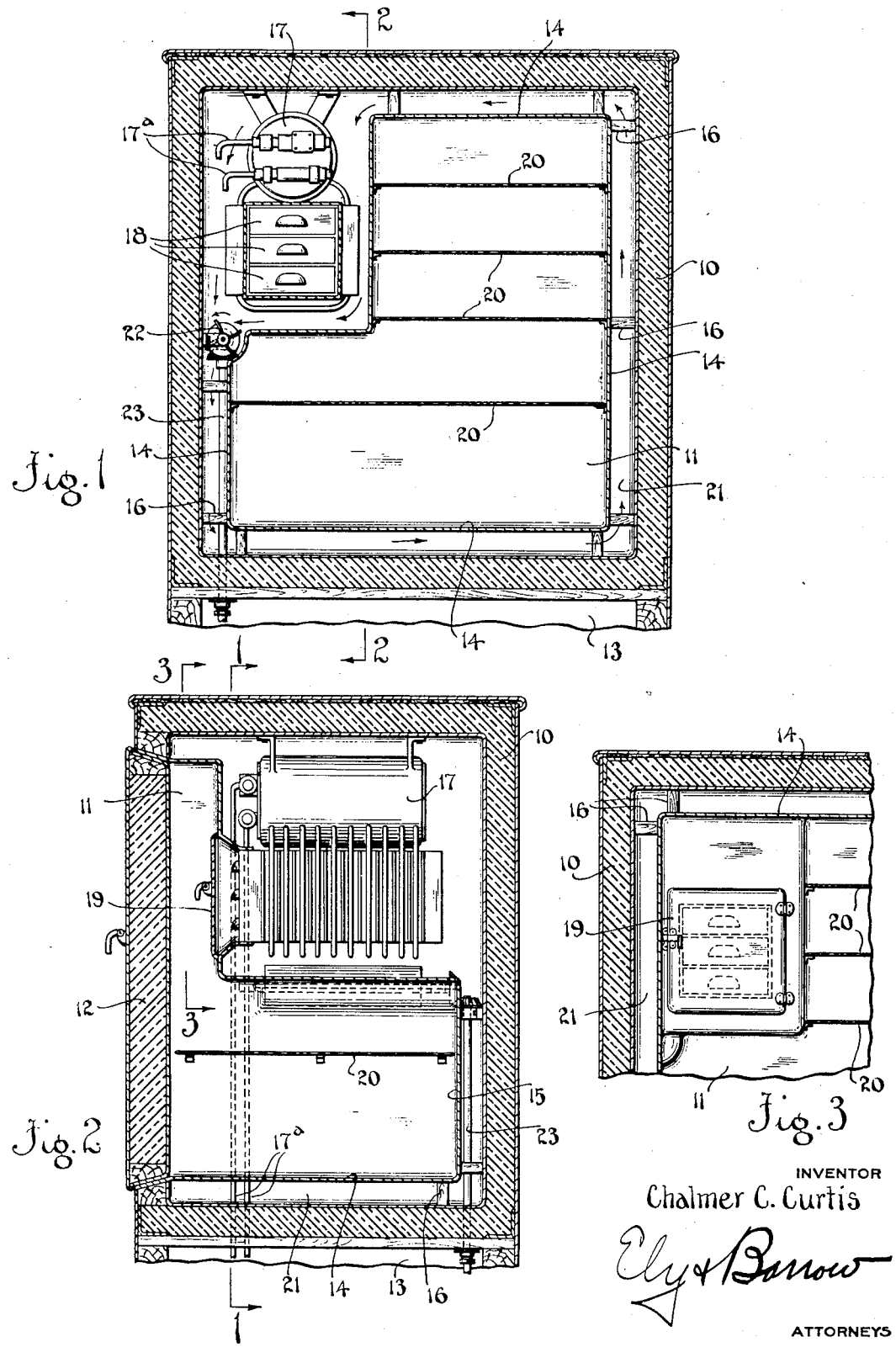

1,921,865

UNITED STATES PATENT OFFICE 1,921,865

REFRIGERATOR

Chalmer C. Curtis, Cuyahoga Falls, Ohio

Application January 31, 1931. Serial No. 512,593

4 Claims. (Cl. 62—116)

This invention relates to refrigerators of the mechanical type for domestic use, wherein heat extraction is effected by means of the vaporization of liquids and their return to their normal liquid condition.

Refrigerators of the type mentioned usually comprises a refrigerating unit that is mounted within the refrigerator housing or chest in heat-transfer relation to the air that circulates through the food compartment of the chest, the motor, compressor and other mechanisms for treating the refrigerant being suitably positioned within or upon the refrigerator exteriorly of the food compartment. The refrigerating unit usually is provided with one or more sharp-freezing compartments for making ice cubes and frozen desserts, and the entire unit is maintained at a temperature below the freezing point of water.

Refrigerators of the type mentioned require more or less frequent defrosting of the refrigerating unit to remove from the exterior surface thereof the accumulated frost that has been frozen out of the air that circulates within the food compartment. Accumulation of frost on the refrigerating unit not only reduces the efficiency thereof, but the freezing out of moisture from the circulating air causes the latter to extract more moisture from the food, with the result that closed containers are necessary for the proper preservation of many foods.

The chief objects of this invention are to improve the conditions under which foods are refrigerated; to avoid the necessity of defrosting; greatly to reduce the drying out of foods in refrigerators; and to obviate the necessity for airtight food containers.

The foregoing objects are achieved by so constructing and arranging the refrigerating unit and the food compartment of the refrigerator that the air in the latter does not come into contact with surfaces that are chilled to freezing temperature, equivalent refrigeration in the food compartment being attained by the provision of cooling surfaces of greater area than is found in the present standard refrigerators.

Of the accompanying drawing:

Figure 1 is a vertical section of a refrigerator embodying the invention in its preferred form, as viewed from the line 1—1 of Figure 2;

Figure 2 is a section on the line 2—2 of Figure 1; and

Figure 3 is a section on the line 3—3 of Figure 2.

Referring to the drawing, 10 is the usual refrigerator chest or cabinet, 11 is a food compartment in the upper portion thereof to which access is had through the door 12, and 13 is a compartment in the lower portion of the cabinet for housing the usual electric or flame operated apparatus (not shown) constituting an operative part of refrigerators of the type illustrated. It will be understood, however, that the invention is equally applicable to refrigerators having their operative mechanism in or upon the top of the cabinet.

The food compartment 11 preferably has side, top, and bottom walls 14, 14 and a rear wall 15 of thin sheet metal or other suitable material of good heat conductivity that is suitably supported by wood blocks 16 or the like in spaced relation to the walls of the cabinet proper. However, the rear wall 15 may be omitted if desired, and the side walls 14 extended to the rear wall of the cabinet without materially impairing the efficieny of the improved refrigerator. In an upper interior corner of the cabinet is mounted a refrigerating unit 17 of the usual type which includes a sharp-freezing compartment for trays or pans 18 or the like. The walls 14, 15 of the food compartment are so constructed and arranged as to isolate the refrigerating unit 17 from the said compartment. An inner door 19 is provided for giving access to the trays 18 of the refrigerating unit, the wall 14 behind said door being apertured and the margins of the aperture being sealed about the opening of the sharp-freezing compartment. The usual food trays 20, 20 of woven wire are mounted in the food compartment 11, being supported from the walls 14 thereof. Suitable pipes 17ª, 17ª connect the refrigerating unit 17 with the operating mechanism in the lower compartment 13.

The arrangement is such that the food compartment 11 has a sealed chamber or passage 21 on all sides thereof except at the front, the refrigerating unit 17 being located in said passage and adapted to chill a suitable refrigerant therein, which refrigerant may consist of air or other gaseous fluid, or liquid such as brine. Chilling of the refrigerant in an upper part of the passage 21 induces convection currents which circulate around the food chamber in the direction indicated by the arrows in Figure 1, and, if desired, a suitable fan or impelling member 22 may be mounted in the said passage to accelerate such circulation, the impelling member being operated by a drive shaft 23 that extends into the lower compartment 13 and is suitably connected to a power unit therein.

In the operation of the refrigerator, the usual sub-freezing temperature is maintained in the refrigerating unit 17. Heat transfer from the food compartment 11 to the unit 17 is effected by the fluid refrigerant which circulates throughout the passage 21 and thus chills the metal walls 14, 15 which substantially surround the food compartment. The relatively large area of cooling surface presented by the walls 14, 15 makes it possible to maintain a substantially constant optimum temperature of 42—45 degrees in the food compartment without chilling the said walls to freezing temperature.

Although it is obvious that there will be circulation of air in the food compartment and that some moisture will be withdrawn from the food thereby, there will be no freezing out of said moisture, and the small quantity that will be precipitated upon the walls of the food compartment is not objectionable. Because the air in the food compartment is not excessively dried by the removal of moisture therefrom, it follows that the amount of moisture removed from the food will not be excessive and deleterious to the proper preservation of the food. Since no air from the food compartment comes into contact with the refrigerating unit, there is no frost deposited thereon, whereby the necessity for de-frosting is avoided and the other objects set forth in the foregoing statement of objects are achieved.

Modifications may be resorted to within the scope of the appended claims which are not limited wholly to the specific construction shown and described.

What is claimed is:—

1. In a refrigerator, the combination of a cabinet, a food compartment therein comprising metal walls which are spaced from the walls of the cabinet and define a fluid-tight passage therebetween, and a refrigerating unit mounted in said passage, said unit having a sharp-freezing compartment, the food compartment wall being formed with an aperture therethrough, and the margins of the aperture being sealed to the refrigerating unit about the opening to the sharp-freezing compartment therein.

2. A combination as defined in claim 1 including a door to the opening through the food compartment wall in front of the refrigerating unit.

3. In a refrigerator, the combination of a cabinet, said cabinet being divided into a food chamber, a convection chamber, and a sharp-freezing compartment, a refrigerating unit for cooling the food compartment by inducing convection currents in the convection chamber and for cooling the sharp-freezing compartments by conduction, and means giving access to the sharp-freezing compartment from the food chamber without communication with the convection chamber.

4. In a refrigerator, the combination of a cabinet divided into a food chamber, a convection chamber, and a sharp-freezing compartment, a refrigerating unit mounted in the convection chamber inclosing the sharp-freezing compartment, and a door in the wall of the food chamber giving access to the sharp-freezing compartment without communication with the convection chamber.

CHALMER C. CURTIS.